United States Patent [19]

Phouybanhdyt

[11] Patent Number: 4,982,310
[45] Date of Patent: Jan. 1, 1991

[54] SWITCHGEAR ENCLOSURE WITH IMPROVED ELECTRONIC CONTROL ACCESS DOOR AND LOCK

[75] Inventor: Hinhsomchay Phouybanhdyt, Waukesha, Wis.

[73] Assignee: Cooper Power Systems, Inc., Houston, Tex.

[21] Appl. No.: 115,528

[22] Filed: Oct. 30, 1987

[51] Int. Cl.$^5$ ............................ H02B 5/00; H05K 5/00
[52] U.S. Cl. .................... 361/335; 200/43.22; 200/302.1
[58] Field of Search .............. 200/42.01, 42.02, 43.01, 200/43.11, 43.22, 50 R, 50 A, 50 AA, 293, 302.1; 361/331, 332, 333, 334, 335, 340, 344, 356, 376, 390

[56] References Cited

U.S. PATENT DOCUMENTS

| | | | |
|---|---|---|---|
| 745,403 | 12/1903 | Teamer et al. | 292/60 |
| 803,335 | 10/1905 | Frisbee | 292/60 |
| 1,275,363 | 8/1918 | Barnard | 292/175 |
| 1,304,334 | 5/1919 | Long | 292/175 |
| 1,693,158 | 11/1928 | Reinicke et al. | 292/60 |
| 1,701,429 | 2/1929 | Thompson | 292/42 |
| 1,851,230 | 3/1932 | Young | 200/50 A |
| 2,760,021 | 8/1956 | Cole et al. | 200/50 A |
| 2,930,940 | 3/1960 | Trumpler . | |
| 2,952,799 | 9/1960 | Wortman et al. | 361/335 |
| 3,233,932 | 2/1966 | Utterback | 292/175 |
| 3,340,441 | 9/1967 | Probert . | |
| 3,796,922 | 3/1974 | Mrenna et al. . | |
| 3,991,348 | 11/1976 | Evans . | |
| 4,031,340 | 6/1977 | Pestorel | 200/50 A |
| 4,034,169 | 7/1977 | Armstrong et al. | 200/50 A |
| 4,073,000 | 2/1978 | Kresja | 361/344 |

FOREIGN PATENT DOCUMENTS 971661 7/1975 Canada .

Primary Examiner—A. D. Pellinen
Assistant Examiner—David A. Osborn
Attorney, Agent, or Firm—Michael, Best & Friedrich

[57] ABSTRACT

A switchgear apparatus comprising a switch mechanism, electrical controls for the switch mechanism, a weatherproof door movable between a closed position and an open position for respectively preventing and affording access to the electrical controls, a housing enclosing the switch mechanism and the electrical controls and including a second door for affording access to the weatherproof door, a third door movable between an open position and a closed position, an operating handle movable between an open position and a closed position, the operating handle being locatable in the open position only when the third door is in the open position, and a mechanism for releasably retaining the second door in the closed position, the mechanism being releasable only when the operating handle is in the open position.

25 Claims, 2 Drawing Sheets

U.S. Patent    Jan. 1, 1991    Sheet 1 of 2    4,982,310
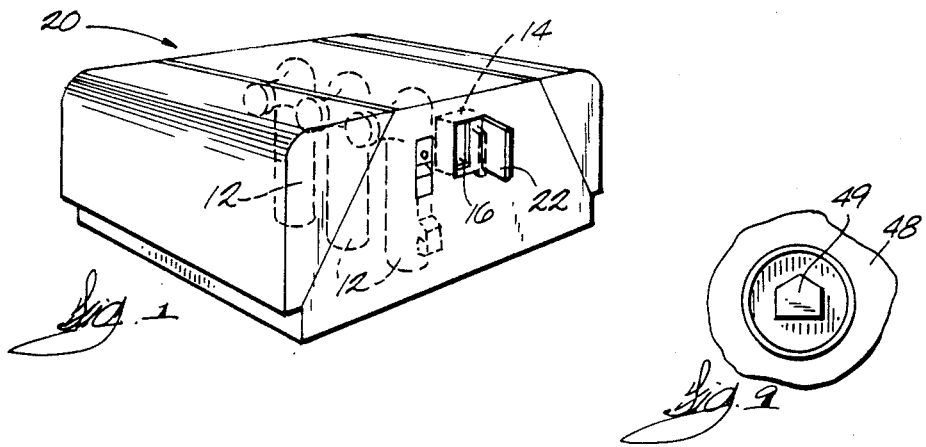
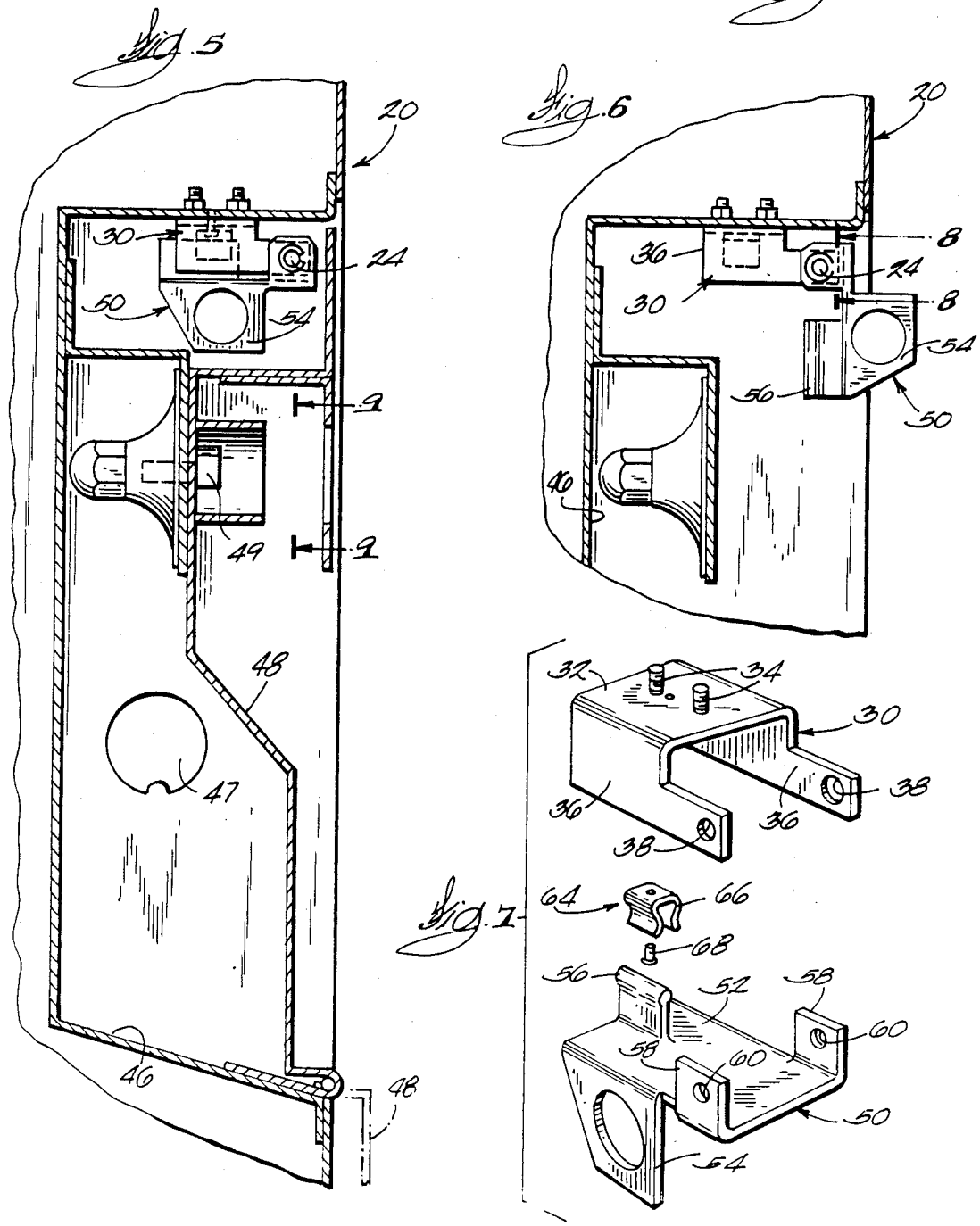

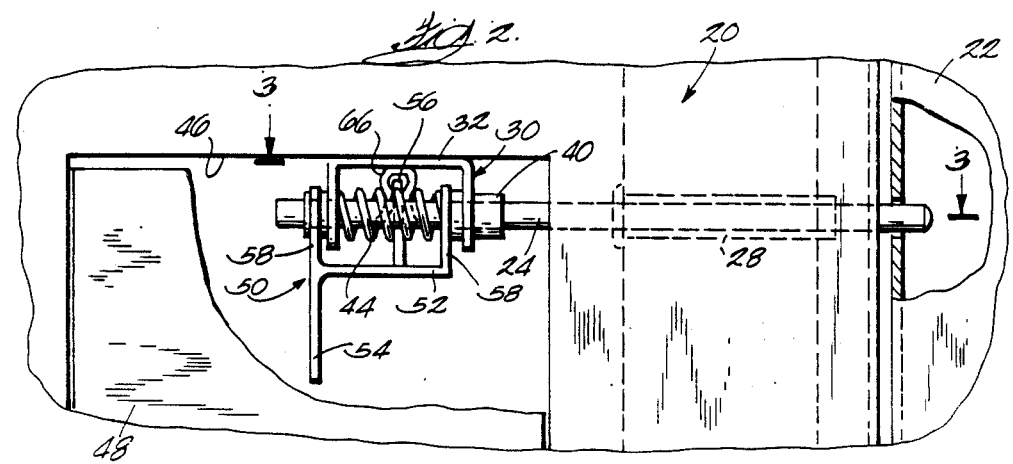
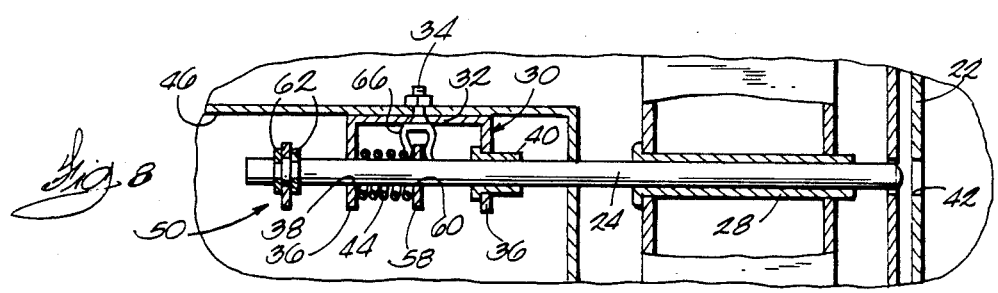
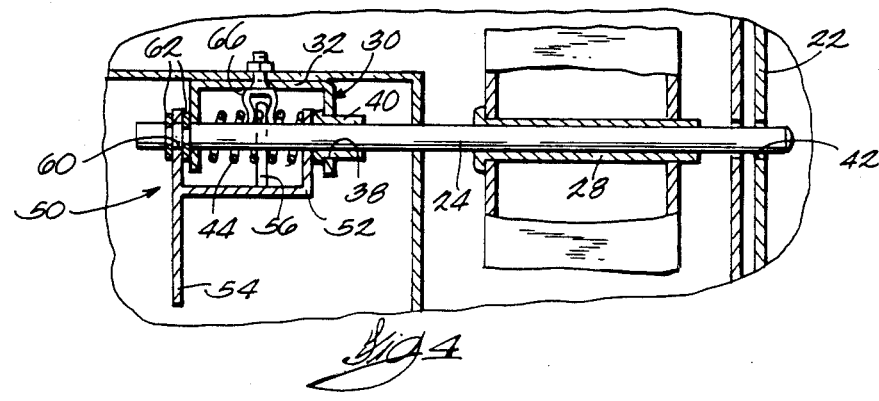
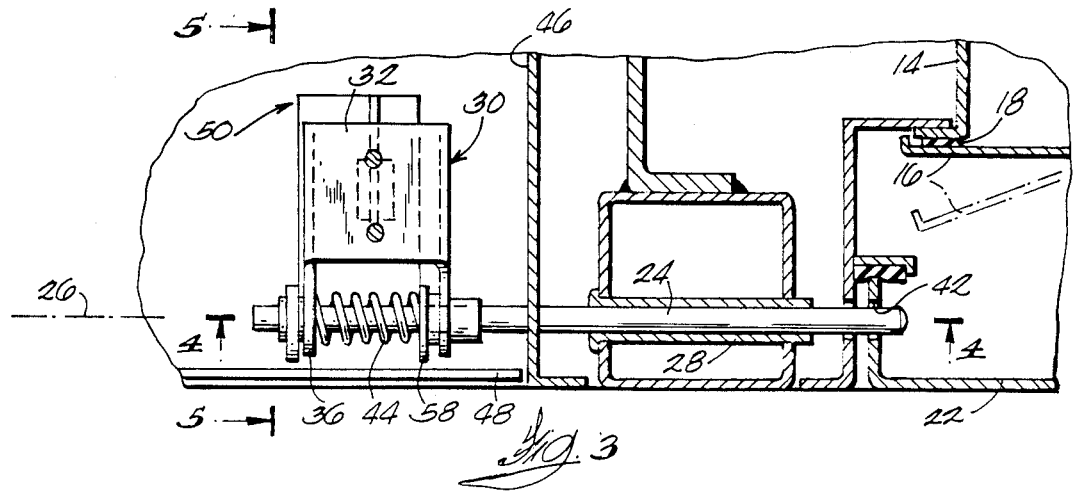

SWITCHGEAR ENCLOSURE WITH IMPROVED ELECTRONIC CONTROL ACCESS DOOR AND LOCK

BACKGROUND OF THE INVENTION

The invention relates to switchgear apparatus, and more particularly to access doors and locks for electronic controls of switchgear apparatus.

Industry standards require that access doors for switchgear electronic controls be locked. Typically, pentahead bolts are used to secure access doors, and padlocks are used to prevent access to the pentahead bolts. This requires a separate pocket to accommodate a padlock or pentahead bolt.

Furthermore, access doors for switchgear electronic controls are usually weatherproof in order to prevent damage to the electronic controls. Access doors are usually weatherproofed by providing some type of seal around the door. Unfortunately, unauthorized attempts to force access doors open usually result in damage to the seal and a loss of weatherproofing.

SUMMARY OF THE INVENTION

The invention provides a switchgear enclosure in which the lock mechanism for the electronic control access door is located in a switch operating handle box. Access to the lock mechanism is obtained by opening the operating handle door and moving the operating handle to the open position.

More particularly, the invention provides a switchgear apparatus comprising a housing or enclosure enclosing a switch or interrupter mechanism and the electronic control means therefor. The housing includes an access door movable between a closed position and an open position for respectively preventing and affording access to the electronic control means. The housing also includes an operating handle movable between an open position and a closed position, and an operating handle door movable between an open position and a closed position for respectively affording and preventing access to the operating handle. The operating handle is locatable in the open position only when the operating handle door is open. The operating handle door is locked by a conventional pentahead bolt and padlock arrangement.

The apparatus further comprises a lock mechanism including a bolt axially movable between a locked position wherein the bolt prevents opening of the access door and an unlocked position wherein the bolt permits opening of the access door, and means for biasing the bolt toward the locked position. The operating handle is pivotally mounted on the bolt for movement between the open position and the closed position, and the operating handle is connected to the bolt for movement therewith along the axis of the bolt. The lock mechanism further includes means for preventing movement of the operating handle to move the bolt to the unlocked position when the operating handle is in the closed position. This means preferably includes a clip mounted on the housing and engaging the operating handle when the operating handle is in the closed position.

In the preferred embodiment, the apparatus further comprises a weatherproof inner door for alternatively preventing and affording access to the electronic control means, and the above-mentioned access door alternatively affords and prevents access to the weatherproof door. The combination of the access door and the inner door provides tamper-resistant means for preventing access to the electrical controls. Preferably, the apparatus comprises a control unit mounted in the housing and including the electronic controls and the weatherproof door.

Other features and advantages of the invention will become apparent to those skilled in the art upon review of the following detailed description, claims and drawings.

DESCRIPTION OF THE DRAWINGS

FIG. 1 is a perspective view of a switchgear apparatus embodying the invention and including a side panel having therein an operating handle recess and an electronic control recess. The operating handle recess has therein an operating handle, a mounting bracket and a clip.

FIG. 2 is an enlarged, partial, elevational view of the side panel.

FIG. 3 is a view taken along line 3—3 in FIG. 2.

FIG. 4 is a view taken along line 4—4 in FIG. 3.

FIG. 5 is a view taken along line 5—5 in FIG. 3.

FIG. 6 is a partial view similar to FIG. 5 and showing the operating handle in the open position.

FIG. 7 is an exploded, perspective view of the operating handle mounting bracket and clip.

FIG. 8 is a view taken along line 8—8 in FIG. 6.

FIG. 9 is a view taken along line 9—9 in FIG. 5.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A switchgear apparatus 10 embodying the invention is illustrated in the drawings. The apparatus 10 comprises at least one switch or interrupter mechanism 12, and preferably a plurality of such mechanisms 12, some of which are shown in dotted lines in FIG. 1. The apparatus 10 also comprises a control unit 14 including electrical control means for the switch mechanisms 12. Such control means are known in the art and need not be described in greater detail.

The apparatus 10 also comprises (see FIGS. 1 and 3) a weatherproof door 16 movable between a closed position (shown in solid lines) and an open position (shown in dotted lines) for respectively preventing and affording access to the electrical control means. As shown in FIG. 3, the weatherproof door 16 includes seal means 18 for preventing exposure of the electrical control means. Preferably, the door 16 is an integral part of the control unit 14. Stop means (not shown) is provided for preventing movement of the door 16 beyond the open position.

The apparatus 10 also comprises a housing 20 enclosing the switch mechanisms 12 and the control unit 14. The housing 20 includes (see FIGS. 1 and 3) an outer access door 22 movable between an open position (shown in FIG. 1) and a closed position (shown in FIG.

3) for respectively affording and preventing access to the weatherproof door 16. Preferably, the door 22 is spring loaded to the open position and has a continuous hinge (not shown). Also, stop means (not shown) is provided for preventing movement of the door 22 beyond the open position.

The apparatus 10 further comprises (see FIGS. 2-4) means for releasably retaining the access door 22 in the closed position. While various suitable retaining means can be employed, in the preferred embodiment, the retaining means includes a bolt 24 extending along an axis 26 and being slidably supported by the housing 20. As shown in FIGS. 2-4, the bolt 24 is slidably supported by a bushing 28 which in turn is supported by the housing 20. The bolt 24 is also supported by a mounting bracket 30 fixedly connected to the housing 20. As shown in FIG. 7, the mounting bracket 30 includes a generally horizontal portion 32 connected to the housing 20 by suitable means such as bolts 34, and a pair of spaced apart, generally vertical portions 36 extending downwardly from the horizontal portion 32. Each of the vertical portions 36 includes an integral, forwardly extending portion having therein an aperture 38 centered on the bolt axis 26. The bolt 24 extends through the apertures 38 for axial and pivotal movement of the bolt 24 relative to the mounting bracket 30. As shown in FIG. 4, the right aperture 38 has therein a bushing 40 which slidably and rotatably supports the bolt 24.

The bolt 24 is axially movable in a first direction (to the right in FIGS. 2-4) to a locked position (shown in FIG. 3) wherein the bolt 24 extends through an aperture 42 in the door 22, and the bolt 24 is movable in an opposite second direction (to the left in FIGS. 2-4) to an unlocked position (shown in FIG. 4) wherein the bolt 24 is withdrawn from the aperture 42.

The retaining means also includes means for biasing the bolt 24 in the first direction or to the locked position. While various suitable biasing means can be used, in the preferred embodiment, the biasing means includes a spring 44. The manner in which the spring 44 biases the bolt 24 to the locked position is described hereinafter.

It is noted that the combination of the locked outer door 22 and the inner door 16 provides tamper-resistant means for preventing access to the electrical control means.

The apparatus 10 also comprises an operating handle recess 46 located in the housing 20. The recess 46 has therein a shaft 47 for operating the switch mechanisms 12 and a tool (not shown) for rotating the shaft 47. The apparatus 10 also comprises an operating handle door 48 movable between an open position (shown in dotted lines in FIGS. 1 and 5) and a closed position (shown in solid lines in FIGS. 1 and 5) for respectively affording and preventing access to the operating handle recess 46. Preferably, the door 48 is located adjacent the door 22 and is an integral part of the housing 20. As shown in FIGS. 5 and 9, a pentahead bolt 49 is provided for locking the door 48, i.e., for releasably retaining the door 48 in the closed position. A padlock (not shown) is provided for preventing access to the bolt 49. This arrangement is conventional.

The apparatus 10 also comprises an operating handle 50 located in the operating handle recess 46. Referring to the operating handle 50 in its closed position, or as shown in FIG. 7, the operating handle 50 includes a generally horizontal portion 52, and a downwardly extending operator actuatable portion 54. The operating handle 50 further includes an upwardly extending projection 56 including an enlarged upper end. The reason for the projection 56 is explained hereinafter. The operating handle 50 also includes a pair of spaced apart, upwardly extending portions 58 having therein respective apertures 60 pivotally receiving the bolt 24.

The operating handle 50 is mounted on the bolt 24 for pivotal movement between an open position (shown in solid lines in FIG. 6) and a closed position (shown in solid lines in FIG. 5). Also, the operating handle 50 is connected to the bolt 24 for movement therewith along the axis 26 of the bolt 24. While various suitable means can be used for connecting the operating handle 50 to the bolt 24, in the illustrated construction, such means includes a pair of snap rings 62 secured to the bolt 24 and located on opposite sides of the left portion 58 of the handle 50 so that the bolt 24 is not axially movable relative to the operating handle 50. As shown in FIGS. 3 and 4, the mounting bracket 30 is located in the recess 46 and the spring 44 is located between the left portion 36 of the mounting bracket 30 and the right portion 58 of the operating handle 50, so that the spring 44 biases the operating handle 50, and thus the bolt 24, to the right relative to the mounting bracket 30 and to the housing 20.

The retaining means is releasable only when the door 48 is in the open position and the operating handle 50 is in the open position.

As shown in FIGS. 5 and 6, the operating handle door 48 prevents movement of the operating handle 50 to the open position when the door 48 is in the closed position. Therefore, the operating handle 50 is locatable in the open position only when the operating handle door 48 is in the open position.

Because the operating handle 50 is connected to the bolt 24 for axial movement therewith, movement of the operating handle 50 toward the unlocked position causes movement of the bolt 24 toward the unlocked position. The retaining means preferably also includes means for preventing movement of the operating handle 50 toward the unlocked position when the operating handle 50 is in the closed position. While various suitable preventing means can be used, in the illustrated construction, such means includes clip means 64 mounted on the housing 20 for engaging the operating handle 50 when it is in the closed position. As shown in the drawings, the clip means 64 includes a clip 66 mounted on the underside of the mounting bracket 30 by suitable means such as a fastener 68. The clip 66 is aligned with the upwardly extending projection 56 on the operating handle 50 so that the clip 66 receives the projection 56 and thereby prevents movement of the operating handle 50 axially of the bolt 24 when the operating handle 50 is in the closed position. When the operating handle 50 is moved from the closed position to the open position, the projection 56 moves out of engagement with the clip 66 and the operating handle 50 and bolt 24 can be moved along the axis 26 of the bolt 24.

Thus, in order to unlock the access door 22, the operator unlocks and opens the operating handle door 48, pivots the operating handle 50 to the open position, and moves the operating handle 50 to the left. Movement of the operating handle 50 to the left causes common movement of the bolt 24 and withdraws the bolt 24 from the aperture 42 in the access door 22, thereby permitting opening of the access door 22. Once the access door 22 is open, the weatherproof inner door 16 can be opened.

Because the access door 22 can be opened only after the door 48 is opened, the pentahead bolt 49, which releasably retains the door 48 in the closed position, constitutes single, exteriorly accessible means for releasably retaining the door 22 in the closed position and for releasably retaining the door 48 in the closed position.

Various features of the invention are set forth in the following claims.

I claim:

1. An apparatus comprising
a switch mechanism,
electrical means for controlling said switch mechanism,
a housing enclosing said switch mechanism and said electrical means and including weatherproof first door means movable between a closed position and an open position for respectively preventing and affording access to said electrical means, and second door means for affording access to said first door means,
an operating handle mounted on said housing and movable between an open position and a closed position,
means for releasably retaining said second door means in said closed position, and
operator actuatable means operable only when said operating handle is in said open position for releasing and retaining means.

2. An apparatus as set forth in claim 1 and further comprising a control unit mounted in said housing and including said electrical means and said first door means.

3. An apparatus as set forth in claim 1 wherein said retaining means includes a bolt having a longitudinal axis and being slideably supported by said housing, said bolt being axially movable in a first direction to a locked position and in an opposite second direction to an unlocked position, and means for biasing said bolt in said first direction.

4. An apparatus as set forth in claim 3 wherein said releasing means includes means for moving said bolt in said second direction.

5. An apparatus as set forth in claim 4 wherein said operating handle is mounted on said housing for movement along said axis, wherein said bolt is connected to said operating handle for movement therewith, wherein said biasing means includes means for biasing said operating handle in said first direction, and wherein said means for moving said bolt includes said operating handle.

6. An apparatus as set forth in claim 5 wherein movement of said operating handle from said closed position to said open position is in a direction other than said second direction, and wherein said releasing means further includes means for preventing movement of said operating handle in said second direction when said operating handle is in said closed position.

7. An apparatus as set forth in claim 6 wherein said means for preventing movement of said operating handle includes clip means mounted on said housing for engaging said operating handle when said operating handle is in said closed position.

8. An apparatus as set forth in claim 3 wherein said operating handle is pivotally mounted on said bolt for movement between said open position and said closed position.

9. A switchgear apparatus comprising
a switch mechanism,
electrical means for controlling said switch mechanism,
a housing enclosing said switch mechanism and said electrical means and including first door means movable between a closed position and an open position for respectively preventing and affording access to said electrical means,
an operating handle mounted on said housing for movement along an axis, said handle also being movable between an open position and a closed position, and
means for releasably retaining said first door means in said closed position, said retaining means being releasable only when said operating handle is in said open position, and said retaining means including a bolt extending along said axis and being slideably supported by said housing, said bolt being connected to said operating handle for movement therewith along said axis, and said bolt being axially movable in a first direction to a locked position and in an opposite second direction to an unlocked position, and means for biasing said bolt in said first direction, said biasing means including means for biasing said operating handle in said first direction.

10. An apparatus as set forth in claim 9 wherein movement of said operating handle from said closed position to said open position is in a direction other than said second direction, and wherein said retaining means further includes means for preventing movement of said operating handle in said second direction when said operating handle is in said closed position.

11. An apparatus as set forth in claim 10 wherein said means for preventing movement of said operating handle includes clip means mounted on said housing for engaging said operating handle when said operating handle is in said closed position.

12. An apparatus as set forth in claim 9 wherein said operating handle is pivotally mounted on said bolt for movement between said open position and said closed position.

13. An apparatus as set forth in claim 9 wherein said housing also includes second door means movable between an open position and a closed position for respectively affording and preventing access to said operating handle, and wherein said handle is locatable in said open position only when said second door means is in said open position.

14. An apparatus as set forth in claim 13 wherein said second door means is located adjacent said first door means.

15. A switchgear apparatus comprising
a switch mechanism,
electrical means for controlling said switch mechanism,
a housing enclosing said switch mechanism and said electrical means and including weatherproof first door means movable between a closed position and an open position for respectively preventing and affording access to said electrical means, second door means for affording access to said first door means, and third door means movable between an open position and a closed position,
means for releasably retaining said second door means in said closed position, said retaining means including a bolt having a longitudinal axis and being slideably supported by said housing, said bolt being axially movable in a first direction to a locked position and in an opposite second direction to an unlocked position, and means for biasing said bolt in said first direction, an operating handle movable between an open position and a closed position, said operating handle being pivotally mounted on said bolt for movement between said open position and said closed position, being connected to said bolt for movement therewith along said axis, and being locatable in said open position only when said third door means is in said open position, and means for preventing movement of said operating handle in said second direction when said operating handle is in said closed position, said means for preventing movement of said operating handle including clip means mounted on said housing for engaging said operating handle when said operating handle is in said closed position.

16. An apparatus as set forth in claim 15 and further comprising a control unit mounted in said housing and including said electrical means and said first door means.

17. A switchgear apparatus comprising a switch mechanism, electrical means for controlling said switch mechanism, a housing enclosing said switch mechanism and said electrical means and including first door means movable between a closed position and an open position for respectively preventing and affording access to said electrical means, and second door means movable between an open position and a closed position, an operating handle which is mounted on said housing for movement along an axis, which is movable between an open position and a closed position, and which is accessible only when said second door means is in said open position, and means for releasably retaining said first door means in said closed position, said retaining means being releasable only when said second door means is in said open position, said retaining means being releasable only when said operating handle is in said open position, and said retaining means including a bolt slideably supported by said housing, said bolt being connected to said operating handle for movement therewith along said axis, and said bolt being axially movable in a first direction to a locked position and in an opposite second direction to an unlocked position, and means for biasing said bolt in said first direction, said biasing means including means for biasing said operating handle in said first direction.

18. An apparatus as set forth in claim 17 wherein movement of said operating handle from said closed position to said open position is in a direction other than said second direction, and wherein said retaining means further includes means for preventing movement of said operating handle in said second direction when said operating handle is in said closed position.

19. An apparatus as set forth in claim 18 wherein said means for preventing movement of said operating handle includes clip means mounted on said housing for engaging said operating handle when said operating handle is in said closed position.

20. An apparatus as set forth in claim 17 wherein said operating handle is pivotally mounted on said bolt for movement between said open position and said closed position.

21. An apparatus as set forth in claim 17 wherein said second door means is located adjacent said first door means.

22. An apparatus as set forth in claim 17 and further comprising means accessible only when said second door means is in said open position for operating said switch mechanism.

23. An switchgear apparatus comprising a switch mechanism, electrical means for controlling said switch mechanism, an operating handle movable between an open position and a closed position, a housing supporting said operating handle, enclosing said switch mechanism and said electrical means and including first door means movable between a closed position and an open position for respectively preventing and affording access to said electrical means, and second door means movable between an open position and a closed position for respectively affording and preventing access to said operating handle, and means for releasably retaining said first door means in said closed position, said retaining means being releasable only when said operating handle is in said open position, and said operating handle being locatable in said open position only when said second door means is in said open position.

24. A switchgear apparatus comprising a switch mechanism, electrical means for controlling said switch mechanism, a housing enclosing said switch mechanism and said electrical means and including first door means movable between a closed position and an open position for respectively preventing and affording access to said electrical means, an operating handle mounted on said housing and movable between an open position and a closed position, and means for releasably retaining said first door means in said closed position, said retaining means being releasable only when said operating handle is in said open position, said retaining means including a bolt having a longitudinal axis and being slideably supported by said housing, said bolt being axially movable in a first direction to a locked position and in an opposite second direction to an unlocked position, and said operating handle being pivotally mounted on said bolt for movement between said open position and said closed position, and said retaining means also including means for biasing said bolt in said first direction.

25. A switchgear apparatus comprising a switch mechanism, electrical means for controlling said switch mechanism, a housing enclosing said switch mechanism and said electrical means and including first door means movable between a closed position and an open position for respectively preventing and affording access to said electrical means, and second door means movable between an open position and a closed position, an operating handle which is mounted on said housing, which is movable between an open position and a closed position, and which is accessible only when said second door means is in said open position, and means for releasably retaining said first door means in said closed position, said retaining means being releasable only when said second door means is in said open position, said retaining means being releasable only when said operating handle is in said open position, and said retaining means including a bolt having a longitudinal axis and being slideably supported by said housing, said bolt being axially movable in a first direction to a locked position and in an opposite second direction to an unlocked position, and said operating handle being pivotally mounted on said bolt for movement between said open position and said closed position, and means for biasing said bolt in said first direction.

* * * * *